Jan. 9, 1945.  A. F. HICKMAN  2,366,730
FLOATING CHAIR TYPE SEAT
Filed Jan. 6, 1941   3 Sheets-Sheet 1
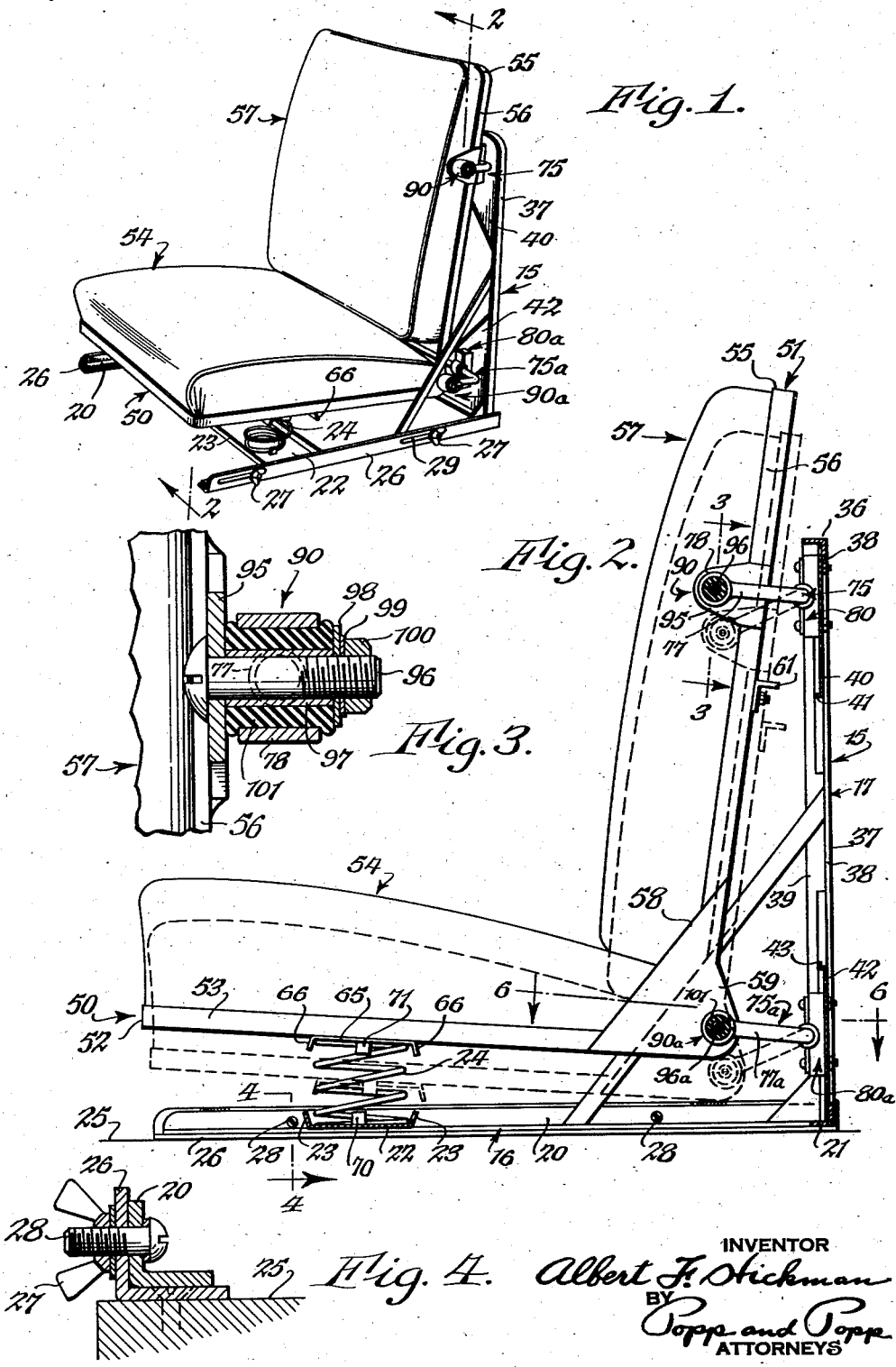
INVENTOR
Albert F. Hickman
BY Popp and Popp
ATTORNEYS Jan. 9, 1945.  A. F. HICKMAN  2,366,730

FLOATING CHAIR TYPE SEAT

Filed Jan. 6, 1941  3 Sheets-Sheet 2

INVENTOR
Albert F. Hickman
BY Popp and Popp
ATTORNEYS

Jan. 9, 1945. A. F. HICKMAN 2,366,730
FLOATING CHAIR TYPE SEAT
Filed Jan. 6, 1941 3 Sheets-Sheet 3
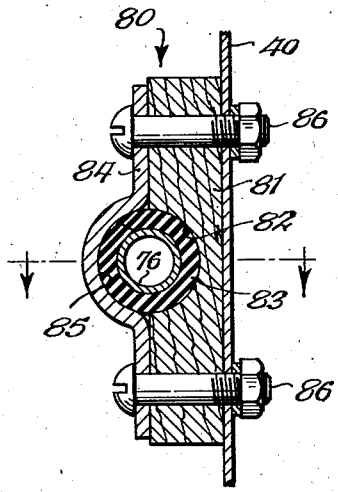
Fig. 8.
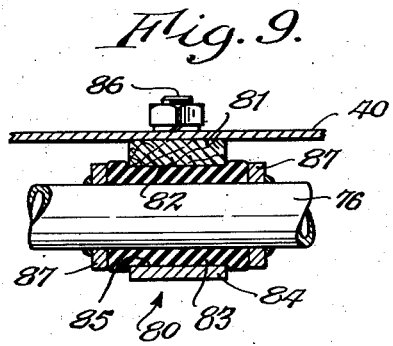
Fig. 9.
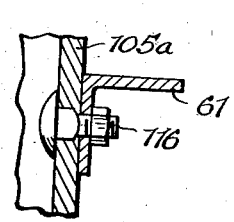
Fig. 10.
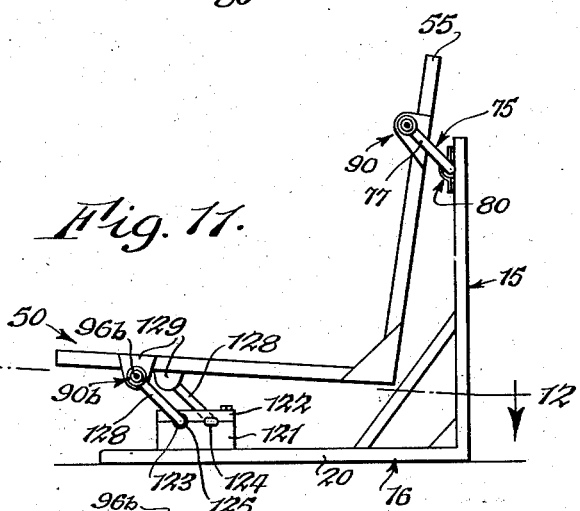
Fig. 11.
Fig. 13.
Fig. 12.
INVENTOR
Albert F. Hickman
BY
Popps and Popps
ATTORNEYS Patented Jan. 9, 1945

2,366,730

UNITED STATES PATENT OFFICE 2,366,730

FLOATING CHAIR TYPE SEAT

Albert F. Hickman, Eden, N. Y., assignor to Hickman Pneumatic Seat Co., Inc., Eden, N. Y., a corporation of New York Application January 6, 1941, Serial No. 373,273

6 Claims. (Cl. 155—9)

This invention relates to a seat and more particularly to a resiliently mounted floating chair type seat adapted for use in vehicles such as trucks, busses, locomotive cabs, pleasure cars and the like to cushion the driver or passengers against objectionable or harmful shocks, jars and vibrations caused by the vehicle passing over uneven roads or rails. The floating chair type seat forming the subject of the invention is, however, also available for use in boats or on vibrating stationary machinery or wherever a resiliently mounted seat is desirable.

The present invention is an improvement on the general type of resiliently suspended seats shown in my prior United States Patents Nos. 1,774,009 and 1,929,023 granted August 26, 1930, and October 3, 1933, respectively.

Trucks, busses, locomotives and the like having conventional leaf spring suspensions, even when provided with shock absorbers, are extremely uncomfortable to the seated drivers and passengers, particularly when a light load is being carried, since the vibrations and jars of the vehicle in passing over an uneven road or railroad track are not effectively absorbed by the conventional leaf spring suspension and are transmitted to the seats and render the riding or driving of the vehicle uncomfortable. Serious illnesses and permanent injury to truck drivers or others who regularly ride such vehicles, particularly kidney trouble and other afflictions, have been traced directly to the constant violent vibration and jars to which the truck driver is subjected in driving his truck.

It is the principal object of this invention to provide such a resiliently mounted floating chair type seat which prevents such objectionable jars and vibrations of all frequencies from being transmitted to the body of the driver or passenger seated in the vehicle and which also has superior ride characteristics, the chair frame being yieldingly restrained against undue movement, its resilient support having rapid loading and unloading characteristics beyond the normal range of movement of the seat and the direction of movement of the seat being controlled.

Another object of the invention is to provide such a floating chair type seat in which the principal resilient support for the chair frame is in the form of inexpensive metal springs thereby to permit the quantity production of such seats at very low cost.

Another object is to provide a floating, guided and resiliently mounted chair frame which is so constructed as to permit of its use in the curtailed space provided in a truck cab for such a seat, which is strong and durable and will operate smoothly and easily without attention, which is relatively light in weight, and in which the moving parts are adequately guarded so that there is no danger of the occupant suffering injury while riding on the seat.

Another object is to provide such a floating chair type seat having a chair frame which is resiliently mounted on a subframe or supporting structure which in turn is adjustably secured to the frame of the automobile so as to permit the seat to be readily adjusted to suit the stature of each individual driver.

A further aim is to provide such a floating chair type seat which will adequately absorb all objectionable shocks, jars and vibrations regardless of the weight of the driver or the number of persons in the seat and is so guided in its movement that the chair frame rides easily and naturally without tendency to rock or jolt the occupant forwardly.

Another object is to provide such a floating chair type seat in which the improved ride characteristics are in part obtained by pneumatic control and in which the provision of this pneumatic control is incident to the provision of upholstery for the seat.

Another object is to provide such a seat in which friction shock absorbers are unnecessary to the proper operation of the seat.

Another object is to provide such a seat in which adequate cushioning is provided with a very small vertical movement of the chair frame.

Other objects of the invention are to provide such a floating chair type seat which is extremely simple and inexpensive in construction, is composed of few parts which are not liable to get out of order, which does not require frequent servicing, such as lubrication or adjustment to take up wear, and which will not develop objectionable squeaks or noises even when subjected to conditions of severe and constant use.

In the accompanying drawings:

Fig. 1 is a perspective view of the preferred form of resiliently mounted floating chair type seat made in accordance with my invention.

Fig. 2 is an enlarged, vertical section taken on line 2—2, Fig. 1.

Figs. 3 and 4 are further enlarged, fragmentary, vertical sections taken on the correspondingly numbered lines in Fig. 2.

Fig. 8 is an enlarged, fragmentary, vertical section taken on line 8—8, Fig. 5.

Fig. 9 is an enlarged, fragmentary, horizontal section taken on line 9—9, Fig. 8.

Fig. 10 is a fragmentary, horizontal section taken on line 10—10, Fig. 5.

Fig. 11 is a diminutive view similar to Fig. 2 showing the seat cushions removed and showing a modified form of the invention in which torsion rods are used in place of the helical springs shown in Figs. 1—10.

Fig. 12 is a horizontal section taken on line 12—12, Fig. 11.

Fig. 13 is a view similar to Fig. 11 showing a still further modified form of my invention.

Figure 5:
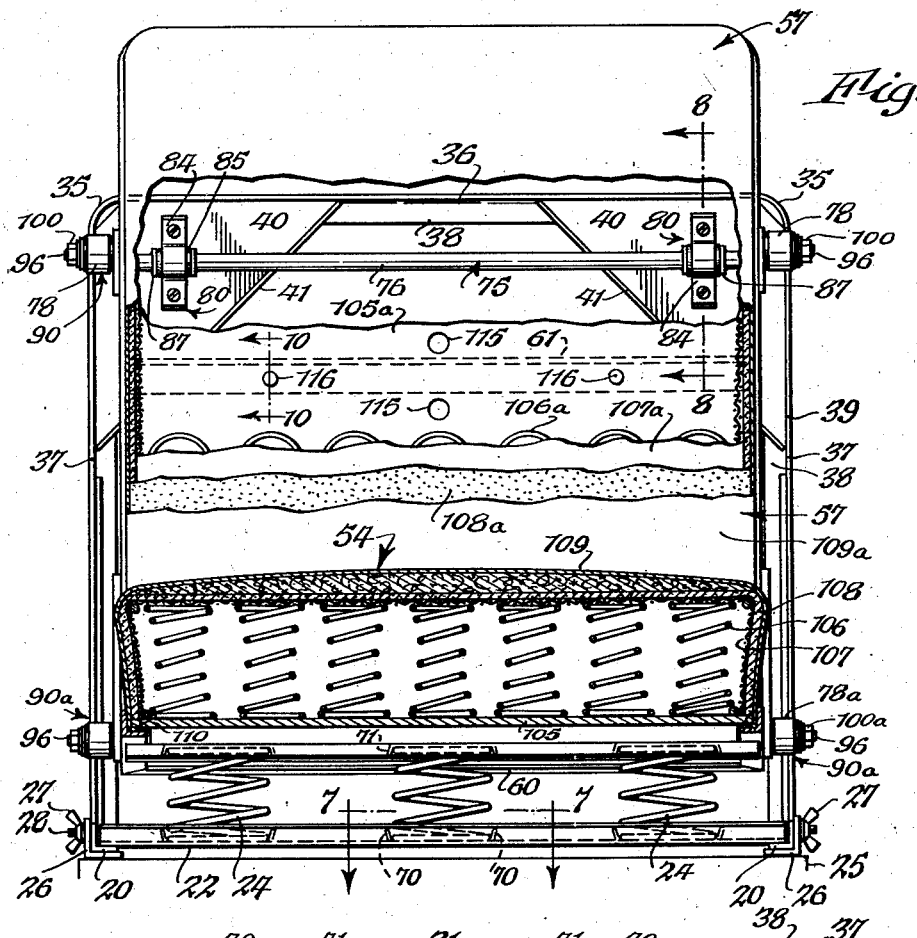
Fig. 5 is a front elevation of the seat shown in Figs. 1—4 and showing parts broken away.

In the form of the invention shown in Figs. 1—10 the chair frame is shown as resiliently mounted on a supporting structure or subframe, indicated generally at 15, in such manner that the chair frame is mainly supported on a transverse row of helical compression springs and is guided and controlled in its movements so that no jarring or lurching of the chair frame occurs as the vehicle is driven over an uneven roadway.

This supporting structure or subframe 15 is shown as constructed of metal and includes a bottom part 16 and a vertical rear part 17 rigidly connected thereto. The bottom part 16 of the subframe is composed of two side inner angle bars 20 connected at their rear ends by a transverse angle bar 21 and connected intermediate their front and rear ends by a cross plate 22. This cross plate is preferably made of sheet metal with its opposite ends resting on and suitably secured, as by welding, to the opposing horizontal flanges of the side bars 20 and is formed at its front and rear edges to provide upturned flanges 23. These flanges 23 are so spaced as to engage and hold or cradle the lowermost coils of a row of helical compression springs 24 as hereinafter described.

Figure 6:
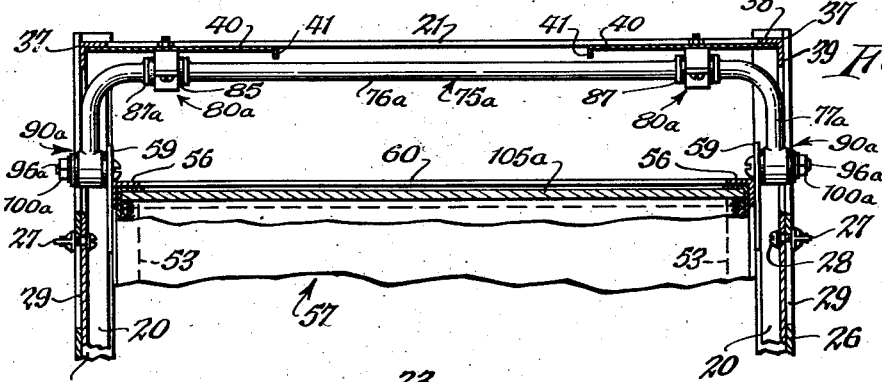
Fig. 6 is a fragmentary, horizontal section taken on line 6—6, Fig. 2.
Figure 7:
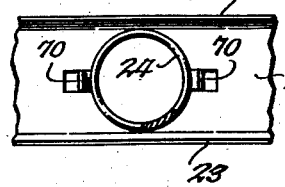
Fig. 7 is a fragmentary, horizontal section taken on line 7—7, Fig. 5.

The bottom part 16 of the supporting structure or subframe 15 is adjustably mounted on the frame 25 of the vehicle and for this purpose each of the side angle bars 20 of the subframe are slidingly nested in an angle bar 26, the outer side flanges of which angle bars 26 engage the side flanges of the angle bars 20 and hold the subframe against lateral displacement and the inwardly extending bottom flanges of which can be secured to the frame 25 of the vehicle in any suitable manner and slidingly support the corresponding flanges of the angle bars 20 of the subframe. It will be seen that the subframe 15 can be slid forwardly and backwardly in the cab of the vehicle on the angle bars 26 to suit the height of the driver. When properly adjusted, this adjustment is maintained by tightening wing nuts 27 on studs 28 secured to the side angle bars 20 of the subframe and extending through horizontal slots 29 provided in the side flanges of the fixed angle bars 26, as best shown in Figs. 1 and 6.

The vertical rear part 17 of the supporting structure or subframe 15, includes an angle bar which is bent, as indicated at 35, to provide an upper horizontal cross bar 36 and two depending side bars or legs 37. The flanges 38 on one side of the cross bar and legs of this angle bar extend inwardly in opposing relation to one another and the other flanges 39 of this angle bar extend forwardly. The lower ends of the legs or side bars 37 of this angle bar rest upon and can be welded or otherwise suitably secured to the upwardly extending flanges of the side angle bars 20 and rear cross bar 21 of the bottom part 16 of the subframe.

The vertical rear part 17 of the supporting structure 15 is also preferably strengthened and reenforced by a pair of upper plates 40 at its upper corners, these plates being of generally triangular shape and each having two sides welded to the flanges 38 of the cross bar 36 and corresponding side bar or leg 37 and having its third side formed to provide a forwardly extending strengthening flange 41. Similarly, the lower corners of the vertical rear part 17 of the supporting structure or subframe 15 is preferably strengthened or reenforced by a pair of triangular plates 42 each having one side welded to the rear cross bar 21 of the bottom part 16 of the subframe; its vertical side welded to the flange 38 of the corresponding leg 37 of the rear part 17 of the subframe; and its third side provided with a forwardly projecting strengthening flange 43.

The bottom part 16 of the vertical rear part 17 of the subframe or supporting structure 15 are held in substantially perpendicular relation to each other and in order to rigidly maintain these parts in this relation, a triangular reenforcing plate 45 is welded along its lower side to the side flange of each of the side angle bars 20 of the bottom part 16 of the subframe and along its vertical side to the flange 39 of the corresponding vertical leg 37 of the rear part 17 of the subframe.

The chair frame or seat frame is also made of metal and is composed of a seat part 50 rigidly connected with a back part 51. The frame of the seat part 50 is composed of an angle iron bent to provide a horizontal front cross bar 52 and side bars or legs 53 which extend rearwardly from the front of the seat. These bars are arranged so as to form a continuous upwardly extending side flange and a continuously extending bottom flange thereby to provide a recessed frame for the reception of a removable unvented seat cushion 54 as hereinafter described. Similarly, the frame of the back part 51 is composed of an angle iron bent to provide a horizontal upper cross bar 55 and side bars or legs 56 which extend downwardly from the top of the seat. These bars are arranged so as to form a continuously extending back flange and a continuously extending side flange thereby to provide a recessed frame for the reception of a removable, vented, back cushion 57 as hereinafter described.

The corresponding ends of the legs 53 of the frame of the seat part 50 and of the legs 56 of the frame of the back part 51 are preferably secured to each other by welding and each of these joints is preferably reenforced by a triangular side plate 58, the two sides of which are welded to the sides of the corresponding legs 53 and 56 of the chair frame. Each of these triangular side plates 58 is also formed to provide a rearwardly projecting ear 59 for a purpose hereinafter described. To further strengthen the chair frame, a straight angle bar 60, as best shown in Fig. 6, is laid into the recesses provided by the legs 53 and 56 where these legs are joined together and this cross bar is welded at its opposite ends to these legs. The back part 51 of the chair frame can be additionally reenforced by a cross angle bar 61 secured to the rear faces of the side legs 56 of the back part.

Intermediate their front and rear ends and immediately above the cross plate 22, a generally similar cross plate 65 is secured at its ends, by welding or in any other suitable manner, to the bottom flanges of the side legs 53 of the seat part 50 of the chair frame. This cross plate is also preferably made of sheet metal and is formed at its front and rear edges to provide downturned flanges 66 which are so spaced as to engage and hold or cradle the uppermost coils of the helical compression springs 24.

As best shown in Fig. 5, the chair frame is shown as supported on three of these helical springs 24, and as shown in Fig. 2, the uppermost coils of these springs are held against fore and aft displacement by the side flanges 66 of the cross plate 65 while the lowermost coils of these springs are held against fore and aft displacement by the side flanges 23 of the cross plate 22. To hold the springs 24 individually against lateral displacement, a central row of retaining fingers 70 are struck upwardly from the lower cross plate 22, these fingers being arranged in pairs to engage the opposite sides of the lowermost coil of each helical spring 24 and similarly a central row of retaining fingers 71 are struck downwardly from the upper cross plate 65, these fingers 71 being arranged in pairs to engage the opposite sides of the uppermost coil of each helical spring 24.

The chair frame is guided to move in a generally vertical direction by a pair of yokes which are preferably constructed and secured to the subframe and the chair frame as follows:

The back part 51 of the chair frame is connected to the upper end of the rear part 17 of the subframe by an upper yoke 75, which is in the form of a cross rod 76 having an integral forwardly extending arm 77 at each of its ends. At its front end each of these forwardly extending arms 77 is formed to provide an enlarged collar or eye 78, these collars or eyes being in line with each other and their axis being parallel with the axis of the cross rod 76.

Each end of the cross rod 76 of the yoke 75 is supported for rocking movement in a rubber bushed bearing 80, each of these bearings being secured to the corresponding generally triangular bracing plate 40 welded in the upper corners of the rear part 17 of the subframe. As these rubber bushed bearings are identical in construction, a description of one will be deemed to apply to both.

Each of these bearings 80, as best shown in Figs. 8 and 9, is shown as comprising a rear half bearing made of a wooden block 81 and having a horizontally extending half round socket 82 in its front face for the reception of a bushing 83 of resilient yielding material, such as rubber. This bushing surrounds the adjacent portion of the cross rod 76 and is held firmly in engagement with this rod and with the socket 82 in the half bearing block 81 by a front half bearing plate 84 which is formed at its center to provide a horizontally extending socket 85 embracing the front half of the rubber bushing 83. The front half bearing plate 84 and the rear half bearing block 81 are secured to the corresponding triangular bracing plate 40 of the subframe 15 by a pair of bolts 86 which pass through their upper and lower ends and through holes provided in this triangular bracing plate 40. In order to restrain each rubber bushing from displacement from its bearing, a retaining washer or collar 87 is welded to the cross rod 76 at each side of each of the bearings 80, as best shown in Fig. 9.

The front end of each of the arms 77 of the upper yoke 75 is similarly connected to the corresponding side of the chair frame by a rubber bushed bearing, indicated generally at 90. As each of these bearings 90 is identical in construction, a description of one will be deemed to apply to both.

As best shown in Figs. 2, 3 and 5, a plate is welded to the exterior of the side legs 56 of the back part 51 of the chair frame and projects forwardly to provide ears 95 at opposite sides of the chair frame. To each of these ears, as best shown in Fig. 3, is secured an outwardly projecting stud bolt 96 which extends through the corresponding enlarged collar or eye 78 at the end of the adjacent arm 77 of the upper yoke 75. This stud bolt carries a metal bushing 97 which is held against its ear 95 by a washer 98, lock washer 99 and nut 100 provided at the outer end of the stud bolt 96. Tightly confined between the metal bushing 97 and the enlarged collar or eye 78, and between the ear 95 and the washer 98, by the nut 100, is a rubber bushing 101 which is flexed to provide the necessary rocking movement in the bearing 90.

The back part 51 of the chair frame is connected at its lower end to the lower end of the rear part 17 of the subframe by a second yoke 75a. This yoke is identical in construction with the upper yoke 75 and hence the same reference numerals have been employed to designate similar parts, these numerals being distinguished by the suffix a. Similarly, each end of the cross rod 76a of the yoke 75a is supported in a rubber bushed bearing 80a, each of these bearings being secured to the corresponding triangular bracing plate 42 at each lower corner of the rear part 17 of the subframe. These rubber bushed bearings 80a are identical with the bearings 80 and hence the same reference numerals have been applied and distinguished by the suffix a.

The front end of each of the arms 77a of the lower yoke 75a is connected to a stud bolt 96a projecting outwardly from the corresponding ear 59 by a rubber bushed bearing indicated generally at 90a. As these bearings 90a are identical in construction to the bearings 90, the same reference numerals have likewise been applied to similar parts and distinguished by the suffix a.

The removable unvented seat cushion 54 rests loosely in the recess or pocket jointly formed by the upstanding flanges of the front cross bar 52, side legs 53 and rear lower cross bar 60 of the seat part 50 of the chair frame and is preferably constructed as follows:

The numeral 105 represents an imperforate plate of plywood or similar nailable material which conforms to the shape of the recess jointly provided by the upstanding flanges of the front cross bar 52, side legs 53 and rear lower cross bar 60 of the seat part 50 of the seat frame and which forms an imperforate, comparatively rigid bottom for the seat cushion. On this plywood base is secured, in any suitable manner, a spring structure 106 composed of a multiplicity of upholstery springs interconnected in any usual and well known manner to prevent their displacement relative to one another. The top and sides of this spring structure are covered by a layer of burlap 107 and a layer of felted cotton 108 which can be loosely laid over the spring structure. Over the horizontal top of the layer of felted cotton 108 is placed a layer of Spanish moss of the type generally used by upholsterers. The covering or casing 109 of the cushion is made of leather or leatheroid or other similar material which is relatively impervious to the passage of air and before being applied is sewed to provide a seat part and side walls the edges of which terminate adjacent the edges of the plywood base plate 105. These edges are tacked, as indicated at 110, to the underside of this plywood base 105 around its edges.

An important feature of the present invention resides in the fact that the seat cushion 54 is unvented. That is, both the plywood base plate 105 and the leatheroid cover or case 109 are relatively impervious to the passage of air so that when the cushion is compressed the air confined therein can only escape around the sewed and stitched edges of the leatheroid cover or case 109 and when the weight on the seat cushion is relieved the air entering to permit the expansion of the cushion by its internal spring structure can likewise enter only around the sewed and stitched edges of the leatheroid casing or covering 109. By so constructing the seat cushion 54 in unvented form to provide a confined body of air which is only slowly expelled and replaced, the seat cushion is rendered sluggish or slow both in its compression and rebound action. Thus, while the cushion is soft and readily adapts itself to the form of the occupant and also has deep flexibility, the work of protecting the occupant against vertical impacts and vibrations is essentially performed by the spring suspension for the chair frame as a whole and not by the spring structure in the seat cushion. Likewise these springs of the spring structure have no substantial rebound effect.

The vented back cushion 57 is of substantially the same construction as the unvented seat cushion 54 and hence the same reference numerals have been applied and distinguished by the suffix a. To freely vent the back cushion 57, however, two large vent holes 115 are provided in the plywood back panel 105a of the back cushion. The back cushion is supported on the rear end of the seat cushion 54 and is confined in the recess or pocket jointly formed by the forwardly projecting flanges of the top cross bar 55 and side bars or legs 56 of the back part 51 of the chair frame. To prevent the back cushion 57 from falling forwardly carriage bolts 116, as best shown in Fig. 10, are secured to the opposite vertical sides of the plywood back panel 105a of the back cushion to project rearwardly therefrom. These studs 116 project through corresponding holes 117 provided in the cross bar 61 of the back part 51 of the seat frame and can be secured therein in any suitable manner as by nuts on the end of each carriage bolt as illustrated.

In the operation of the floating chair type seat shown in Figs. 1—10, when installed, for example, in the cab of a highway truck, the operator first loosens the wing nuts 27 and adjusts the subframe or supporting structure 15 of the seat fore and aft to suit his height or other driving conditions. This is permitted by the horizontal slots 29 in the fixed angle bars 26, through which the studs 28 carrying these wing nuts extend, these studs being secured to the subframe 15 of the seat and the angle bars 26 being fixed to the frame 25 of the vehicle to form a fore and aft track for the subframe 15.

The operator upon sitting on the unvented seat cushion 54 depresses the entire seat frame to a position in which the forwardly extending arms 77, 77a of the upper and lower yokes 75, 75a are in an approximately horizontal position, these yokes flexing the rubber bushings 83, 83a and 101, 101a in the eight rubber bushed bearings 80, 80a and 90, 90a of these two yokes. The weight of the driver is primarily supported on the three helical compression springs 24 interposed between the seat part 50 of the chair frame and the bottom part 16 of the supporting structure or subframe 15.

In travelling along, if a violent vertical impact is transmitted to the frame 25 of the truck, the chair frame is brought to the dotted line position illustrated in Fig. 2, this vertical impact being largely absorbed by the helical springs 24 which are compressed. The eight rubber bushings for the upper and lower yokes 75, 75a are also stressed to a greater degree by such violent upward impacts. The arms 77, 77a of the yokes 75, 75a, form, in effect, two sides of a jointed parallelogram, and it will therefore be seen that the movement of the chair frame is downward and rearward. These arms 77, 77a are of substantially the same length and it will therefore be seen that this movement of the chair frame is along substantially a straight line and that all parts of the seat move in the same direction. This avoids any tipping or "rocking chair" movement of the chair frame. It will be seen that the length of these arms 77 and 77a of the yokes 75, 75a has a vital bearing on the movement of the chair or seat frame and on securing adequate resilient cushioning of the chair frame with the minimum vertical and fore and aft movement thereof. The length of these arms constitutes an important feature of my invention. It has been found that with a floating chair type seat as shown for use in vehicles, the effective length of each of the levers 77, 77a, that is, from its axis of pivotal connection on the subframe 15 to its axis of pivotal connection on the chair frame, must not exceed five inches. With these arms of this length or less, the chair frame is properly guided in its movement and the weight of the chair frame and its occupant or occupants is adequately carried by the light compression springs 24 and the rubber bushings shown.

In the recoil or upward movement of the chair frame, the helical compression springs return the chair frame to the original loaded position in which the arms 77, 77a of the yokes 75, 75a are in a horizontal position, or slightly higher. It has been found that with the seat constructed as shown, the spring suspension has extremely rapid loading and unloading characteristics, thereby providing rapidly increasing resistance to vertical impacts of the vehicle frame and rapidly damping the rebound of the seat.

In the form of the invention shown in Figs. 11 and 12, the subframe or supporting structure 15 and the chair frame are substantially identical with the form of the invention shown in Figs. 1—10 and therefore the same reference numerals have been employed. Likewise the upper yoke 75 and its rubber bushed bearings 80 and 90 are identical with those shown in Figs. 1—10 and the same reference numerals have been employed.

The lower yoke 75a and the helical compression springs 24 of the form of the invention shown in Figs. 1—10 are, however, substituted by a pair of torsion rods 120 in this modification. For this purpose a lower half bearing block 121 is mounted on each of the side angle bars 20 of the subframe 15, and an upper half bearing block 122 is suitably secured to the lower half bearing block. These half bearing blocks at each side of the chair frame are formed to provide a cylindrical bore 123, and a horizontally flattened or ovalled bore 124, the cylindrical bore 123 of one pair of bearings blocks being transversely in line with the flattened or ovalled bore 124 of the opposite pair of bearing blocks. A rubber bushing 125 is firmly held in each cylindrical bore 123.

The dead end of each torsion rod 120 is deformed or upset, as set forth in my Patent No. 2,213,004, dated August 27, 1940 to fit and anchor in the flattened or ovalled bore 124 of the corresponding pair of half bearing blocks and its opposite end is journaled in the rubber bushing 125 of the opposite pair of half bearing blocks. This opposite end of each torsion rod 120 is also formed to provide a forwardly and upwardly projecting arm 128.

The upper end of each of the arms 128 of the torsion rods 120 is connected to a depending ear 129 of the chair frame by a rubber bushed bearing 90b. These rubber bushed bearings 90b are identical in construction with the rubber bushed bearings 90 and 90a of the form of the invention shown in Figs. 1—10 and the same reference numerals have therefore been applied and distinguished by the suffix b. The arms 128 of the torsion rods 120 are arranged parallel with the arms 77 of the yoke 75, and are of the same effective length, so that it will be seen that they act to guide the lower part of the chair frame in the same manner as the arms 77a of the lower yoke 75a of the form of the invention shown in Figs. 1—10.

It will be seen that the twisting of the torsion rods 120 provides the resilient spring support for the chair frame, these rods thereby acting in substitution for the helical compression springs 24 in the form of the invention shown in Figs. 1—10. In other respects the operation or action of the seat illustrated in Figs. 11 and 12 is identical with that shown in Figs. 1—10.

The form of the invention illustrated in Fig. 13, differs from the form of the invention shown in Figs. 11 and 12 only in the substitution of a pair of spring leaves 130 for the torsion rods 120 illustrated in Figs. 11 and 12. As shown each of these spring leaves 130 is secured at its front end, as indicated at 131, to the corresponding front corner of the bottom part 16 of the subframe 15 and at its rear end, as indicated at 132, to a bracket 133 secured to the corresponding rear corner of the back part 51 of the chair frame. The leaf springs 130 provide the necessary resilient or spring support for the chair frame and it will be seen that this form of the invention operates in the same manner as the form of the invention shown in Figs. 11 and 12 except that the lower part of the chair frame is moved through a slightly different arc from the upper part. However, the arcs of movement of the upper and lower parts of the chair frame are generally parallel with each other and hence even with the leaf springs shown in Fig. 13, the chair frame is guided to move downwardly and rearwardly from its normal loaded position in a substantially straight line in the same manner as with the forms of the invention shown in Figs. 1—12.

From the foregoing it will be seen that the present invention provides a floating chair type seat of very simple and inexpensive construction in which the resilient support is obtained primarily by inexpensive metal springs and which has the proper ride characteristics for use in trucks, busses or the like, particularly in absorbing jars and vibrations of all violence and frequencies and in moving in a substantially straight line downwardly and rearwardly from its normally loaded position, thereby to avoid any lurching or undesired action of the seat. Further, the seat is so constructed as to have a very small vertical movement of its chair frame and at the same time the capability of adequately absorbing violent jars or shocks thereby permitting the use of the seat in the extremely confined space permitted in a truck cab. The seat can also be adjusted to suit each individual driver and the seat is entirely free from squeaks or other noises and requires little servicing or attention even under conditions of severe and constant use.

I claim as my invention:

1. A unitary seat structure, comprising a seat frame having two generally horizontal side bars and a transverse horizontal plate welded at its ends to the central parts of said horizontal side bars and forming the major structural means for preventing the seat frame from racking out of shape, said cross plate having downturned flanges along its front and rear edges, a subframe comprising two generally horizontal side bars and a transverse horizontal plate welded at its ends to the central parts of said horizontal side bars of said subframe and forming the major structural means for preventing the subframe from racking out of shape, said last cross plate having upturned flanges along its front and rear edges, a single row of coil springs interposed between said plates and each having its upper and lower coils arranged between the flanges of the corresponding plate to prevent fore-and-aft displacement of said springs, and means constraining said seat frame to move in a predetermined vertical path relative to said subframe.

2. A unitary seat structure, comprising a seat frame having two generally horizontal side bars and a transverse horizontal plate welded at its ends to the central parts of said horizontal side bars and forming the major structural means for preventing the seat frame from racking out of shape, said cross plate having downturned flanges along its front and rear edges, a subframe comprising two generally horizontal side bars and a transverse horizontal plate welded at its ends to the central parts of said horizontal side bars of said subframe and forming the major structural means for preventing the subframe from racking out of shape, said last cross plate having upturned flanges along its front and rear edges, a single row of coil springs interposed between said plates and each having its upper and lower coils arranged between the flanges of the corresponding plate to prevent fore-and-aft displacement of said springs, and means constraining said seat frame to move in a predetermined vertical path relative to said subframe comprising a pair of spaced yokes each having a horizontal cross part arranged substantially parallel with the front of said seat frame and each having a pair of generally parallel arms extending at right angles therefrom and arranged in a generally horizontal plane in the normal loaded position of the seat frame, means pivotally connecting the horizontal cross part of each yoke at two transversely spaced points to the other of said frames, said arms being rigidly fixed to said cross parts thereby to permit a substantial vertical and a slight fore-and-aft movement of said seat frame but substantially positively preventing lateral movement of said seat frame and tipping and twisting of said seat frame relative to said subframe.

3. A unitary seat structure, including a subframe, a seat frame arranged in closely spaced relation to and above said subframe, means interposed between said subframe and said seat frame for guiding said seat frame to move in a predetermined vertical path toward and from said subframe, comprising a transverse elongated cross plate secured to the underside of said seat frame and having downturned flanges along its front and rear edges, a transverse, elongated cross plate secured to said subframe below said first cross plate and having upturned flanges along its front and rear edges, a single transverse row of coil springs interposed between said plates and each having its upper and lower coils arranged between the flanges of the corresponding plate to prevent fore-and-aft displacement of said springs and means for guiding said sheet frame in its vertical movement to move said plates into misaligned relation as they approach each other thereby to prevent the flanges of said first plate from contacting the flanges of said second plate and whereby said seat is supported on said row of coil springs in its movement from its fully elevated to its fully depressed position.

4. A unitary seat structure for moving vehicles subject to vertical impacts, acceleration and deceleration, comprising a subframe, a seat frame comprising a seat part and a back part rigidly connected to said seat part, means interposed between said subframe and said seat frame and guiding said seat frame to move in a substantially vertical path and substantially preventing fore-and-aft and sidewise movement thereof, means interposed between said subframe and said seat frame for resiliently restraining vertical movements of said seat frame relative to said subframe, a relatively hard and inactive seat cushion mounted on the seat part of said seat frame and upon which the occupant is seated whereby the vertical movements of the occupant are resisted substantially entirely by the resilient supporting means for the seat frame, and a relatively soft and active spring back cushion secured to the back part of said seat frame and against which the back of the occupant rests whereby the rearward movements of the occupant are substantially entirely resisted by said relatively soft and active spring back cushion, the occupant thereby moving vertically in substantially static relation to said cushions to reduce wear thereof.

5. A unitary seat structure for moving vehicles subject to vertical impacts, acceleration and deceleration, comprising a subframe, a seat frame comprising a seat part and a back part rigidly connected to said seat part, means interposed between said subframe and said seat frame and guiding said seat frame to move in a substantially vertical path and substantially preventing fore-and-aft and sidewise movement thereof, means interposed between said subframe and said seat frame for resiliently restraining vertical movements of said seat frame relative to said subframe, an unvented, airbound, relatively hard and inactive seat cushion mounted on said seat part and comprising an imperforate bottom plate, a relatively impervious cover of flexible material secured at its edges to the edges of said bottom plate and a spring structure interposed between said bottom plate and said cover whereby the vertical movements of the occupant are resisted substantially entirely by the said means for resiliently restraining the vertical movements of said seat frame relative to said subframe and a vented, relatively soft and active back cushion secured to said back part of said seat frame and comprising a back plate, a cover of flexible material secured at its edges to the edges of said back plate and a spring structure interposed between said last cover and said back plate, said back cushion being provided with a vent to permit the free escape and ingress of air when said back cushion is compressed or released, whereby the rearward movements of the occupant are substantially entirely resisted by said relatively soft and active back cushion, the occupant thereby moving vertically in substantially static relation to said cushions to reduce wear thereof.

6. A unitary seat structure, comprising a seat frame having two generally horizontal side bars and a transverse horizontal plate welded at its ends to the central parts of said horizontal side bars and forming the major structural means for preventing the seat frame from racking out of shape, said cross plate having downturned flanges along its front and rear edges, a rigid subframe, a single row of coil springs interposed between said plate and said subframe and each having its upper coil arranged between the flanges of said plate to prevent fore-and-aft displacement of said springs, and means constraining said seat frame to move in a predetermined vertical path relative to said subframe comprising a pair of spaced yokes each having a horizontal cross part arranged substantially parallel with the front of said seat frame and each having a pair of generally parallel arms extending at right angles therefrom and arranged in a generally horizontal plane in the normal loaded position of the seat frame, means pivotally connecting the horizontal cross part of each yoke at two transversely spaced points to the other of said frames, said arms being rigidly fixed to said cross parts thereby to permit a substantial vertical and a slight fore-and-aft movement of said seat frame but substantially positively preventing lateral movement of said seat frame and tipping and twisting of said seat frame relative to said subframe.

ALBERT F. HICKMAN.